United States Patent [19]

Davis

[11] Patent Number: 5,918,638

[45] Date of Patent: Jul. 6, 1999

[54] INTERCHANGE SEALING DEVICE AND METHOD

[76] Inventor: Doris Lynn Davis, 14826 Yarberry, Houston, Tex. 77039

[21] Appl. No.: 08/850,731

[22] Filed: May 2, 1997

[51] Int. Cl.⁶ .................................................... F16L 55/12
[52] U.S. Cl. ................................................ 138/89; 138/90
[58] Field of Search ................................. 138/89, 90, 92, 138/94

[56] References Cited

U.S. PATENT DOCUMENTS

| | | | |
|---|---|---|---|
| 411,978 | 10/1889 | Chisholm | 138/94 |
| 646,804 | 3/1900 | Clark | 138/98 |
| 1,850,040 | 3/1932 | Turner | 138/94 |
| 2,171,939 | 9/1939 | Larry et al. | 138/94 |
| 2,773,554 | 12/1956 | Lindorf | 138/90 |
| 3,704,729 | 12/1972 | Tomlinson | 138/90 |
| 4,529,007 | 7/1985 | Goforth | 138/89 |
| 4,585,033 | 4/1986 | Westman | 138/89 |
| 5,511,578 | 4/1996 | Wagner | 138/97 |
| 5,558,130 | 9/1996 | McCabe et al. | 138/98 |

*Primary Examiner*—Denise L. Ferensic
*Assistant Examiner*—James F. Hook
*Attorney, Agent, or Firm*—Townsend and Townsend and Crew

[57] ABSTRACT

A sealing apparatus for providing a sealing engagement with an internal surface of a pipe in order to plug the pipe. The apparatus has a pair of plate members. A sealing member with a pair of flanges is positioned between the pair of plate members. A rod passes through the two plate members and the sealing member. A coupling assembly is connected to one of the plate members for releasably engaging a plunger. A method for plugging a pipe including the steps of disposing the sealing assembly in a pipe; and moving one of the plate members towards the other plate members such that the pair of flanges move outwardly and towards each other to sealably engage the internal surface of the pipe to plug the same.

20 Claims, 11 Drawing Sheets

INTERCHANGE SEALING DEVICE AND METHOD

BACKGROUND OF THE INVENTION

1. Field of the Invention

The present invention is related to an apparatus or device for engaging the internal surface of a conduit or pipe to provide a leakproof interengagement and prevent the flow of a fluid (e.g. liquids, etc.) through the conduit or pipe. More specifically, the present invention provides for an apparatus or device and method for sealing the interchange section of a meter proving assembly to prevent the flow of liquids therethrough. The sealing apparatus of the present invention provides an integrity seal between the inlet and outlet of a unidirect prover (i.e. a meter prover) to insure that all the product metered goes through the unidirect prover and none leaks through the seals.

2. Description of the Prior Art

A mechanical conventional displacement meter prover operates on a common principal, namely: the displacement of a known volume of liquid in a calibrated section of pipe between two signaling detectors by means of a displacer (sphere) which is driven along the pipe by the pressure gradient in the liquid stream being metered. Simultaneously, the corresponding meter volume is being recorded or indicated and the ratio between the known volume in the prover and the meter's indicated volume is called the meter factor.

The mechanical displacement meter prover is a critical element in liquid metering installations because the prover is the volumetric standard against which the flow of meters are calibrated. The prover and all associated piping is an area where high reliability is very important, and the accuracy of the prover itself is dependent upon the resolution of the detector switches and meters, steady-state flow conditions and the sealing factor to determine the volume. For an accurate proving run, it is essential that all the fluid passing through the meter also pass through the prover barrel. Hence, it is essential that a positive seal (Interchange Seal) be provided on the system as liquid must not by-pass the prover when the displacer (sphere) is traveling between the detector switches.

Pipe provers are the most common method for proving metering systems. Volumetric prover tanks and the master-meter-method are used regularly, although a much greater accuracy is gained with pipe provers in the capability of determining the performance of the meters and volume thruput.

A common pipe prover is known as a "unidirect prover". A unidirect prover is one in which a sealing assembly allows the sphere to travel in a pipe section in one direction only, to displace a predetermined volume between two known points in the cylinder. These points are indicated by the electrical indicators. The sphere travels one way through the prover and returns from the receiving side back to the launching side through a uni-directional interchange. The sealing assembly is an integrity seal between the inlet and outlet of the unidirect prover to insure that all the product metered goes through the prover and none leaks through the seals. There is a pressure differential switch installed between the two seals to prove the integrity of the seal. The design of this interchange is very cost effective as it illiminates the need for a diverter valve.

It is therefore important that the sealing assembly within the interchange be reliable in order to obtain an accurate proving run. An inaccurate proving run is costly. The following prior art sealing assemblies do not provide the necessary features to make a successful and/or effective seal for meter proving purposes:

U.S. Pat. No. 100,115—titled: IMPROVEMENT IN TUBE-STOPPER, to W. Brown;

U.S. Pat. No. 2,374,947—titled: HIGH PRESSURE TEST PLUG, to Nicholson;

U.S. Pat. No. 3,006,680—titled PIPE HANDLING APPARATUS. FOR USE IN AND ABOUT A DERRICK, to Gregory;

U.S. Pat. No. 4,303,101—titled END PLUG ASSEMBLY FOR SEWER PIPE, to Tholen;

U.S. Pat. No. 4,381,800—titled PIPE TESTING PLUG to Leslie

U.S. Pat. No. 5,297,691—titled CLOSURE PLUG AND METHODS OF EMPLOYING THE SAME TO MAINTAIN A FIRE-RATED BARRIER, to Bottcher;

U.S. Pat. No. 100,115 to Brown discloses an improvement to a tube-stopper. The improvement consists in a certain combination of a bolt and nut with reversed cones or truncated devices, and a packaging ring, all arranged so that on screwing up the nut, the cones are made to act upon the ring from opposite sides. Such opposed actions on the ring expands or spreads it to thereby cause the ring to close or stop the tube. U.S. Pat. No. 100,115 also discloses in combination with the immediate foregoing, a chamber arranged between the truncated ends of the cones, filled with red lead or any other suitable cement, whereby upon screwing up the nut, the cones are made to force out the cement in order to affect a more perfect sealing or closing of the stopper.

U.S. Pat. No. 2,374,947 to Nicholson discloses a high pressure plug which is designed for use in testing types, tubes or similar tubular objects. The test plug is disclosed as having expanding sections adjustable with respect to each other, and so constructed that when the sections are moved towards each other, the rubber sleeve surrounding the sections and forming a part of the plug, will expand into close engagement with the pipe or tube under test.

U.S. Pat. No. 3,006,680 to Gregory teaches a pipe apparatus for use in and about a derrick. U.S. Pat. No. 3,006,680 more particularly discloses a wet plug which may be used in conjunction with a stand of well pipe or tubing. The wet plug includes a packer member, a cam mechanism disposed above the packer member, and a valve member arranged above the cam mechanism. The packer member is taught as being formed of resilient material such that the cam mechanism may expand the packer member radially outwardly to its pipe sealing position.

U.S. Pat. No. 4,303,101 to Tholen discloses a reusable plug assembly for a pipe, more particularly a sewer pipe. The end plug assembly includes an external plate seal member for bearing against an end portion of a pipe. The external end plate seal member has an inwardly extending sleeve with a flared portion arranged and constructed to have a line engagement with the internal surface of the pipe. The end pipe assembly further includes a wedge member which is to be drawn inwardly of the sleeve, and an external screw member for drawing the wedge into the sleeve and compressing the plate seal against the end of the pipe to provide a simultaneous sealing engagement with the internal surface of the pipe.

U.S. Pat. No. 4,381,800 to Leslie discloses a pipe stopper, more particularly a high pressure pipe tester plug which when inserted into a pipe is capable of isolating a particular joint such as a weld for hydrostatic testing. The plug includes a stem having a threaded section, a smooth section and terminating in a fixed tapered washer. A plurality of grip segments are arranged cylindrically about the stem and have tapered openings at each end. An annular floating mandrel is positioned about the stem for cooperation with the top end of the grip segments. The floating mandrel includes an upper retaining section, an adjacent cylindrical section and a tapered entry section. An O-ring is positioned in an internal recess in the floating mandrel and is adapted for sealable engagement with the smooth section of the stem. A ring-shaped seal, rectangular in cross section, is positioned about the cylindrical section of the floating mandrel and retained by the upper retaining section thereof. A nut threadably engages the threaded portion of the stem and, when tightened, forces the floating mandrel into the top end of the grip segments causing the O-ring to sealably engage the stem and the ring-shaped seal to engage the pipe interior to isolate the joint for testing.

U.S. Pat. No. 5,297,691 to Bottcher discloses a closure plug. The closure plug comprises opposing frusto-conical sections to apply lateral forces to axially compress and radially expand an O-ring to seal the plug within an opening through a fire rated barrier to support or enclose insulating materials which may fill all or part of the opening through the barrier.

Therefore, what is needed and what has been invented is an improved apparatus that is capable of sealing off the insides of a pipe to prevent the flow of fluids therethrough. What is further needed and what has been further invented is a method for plugging a pipe, more particularly for plugging the interchange section of a unidirect prover.

SUMMARY OF THE INVENTION

The present invention accomplishes its desired objects by broadly providing an apparatus for making a sealing engagement with an internal surface of a pipe to plug the pipe to prevent fluid from passing therethrough. The apparatus comprises a first plate member having a first aperture; and a second plate member having a second aperture. A sealing member is provided with a structure defining a bore. A rod member is also provided and has a first end and a second end. The rod member passes through the first aperture, the bore of the sealing member, and the second aperture. The rod threadably engages the sealing member such that the rod is bound to the sealing member. The first and second plate members are capable of being slid along the rod. A first means is attached to the first end of the rod for engaging the first plate member to prevent the first plate member from becoming disengaged from the rod member. A second means is attached to the second end of the rod for being capable of engaging the second plate member to prevent the second plate member from becoming disengaged from the rod member. The apparatus also comprises a coupling assembly including a first coupling member secured to the second plate member and at least one second coupling member connected to the first coupling member for making a releasable connection with a plunger member.

The present invention also accomplishes its desired object by broadly providing an apparatus for engaging an internal surface of a pipe to plug the pipe to prevent fluids from passing through the pipe. The apparatus comprises a first plate member having a first aperture; a second plate member having a second aperture; and a seal having a structure defining a bore. A rod member passes through the first aperture of the first plate member, through the bore of the seal, and through the second aperture of the second plate member. A coupling assembly is connected to the second plate member. The coupling assembly includes a first recess that provides a space whereinto an end of the rod member may extend when the second plate member is moved towards the first plate member. The coupling assembly additionally includes a second recess to provide an opening to engage a plunger member.

The present invention further also accomplishes its desired objects by broadly providing a method for plugging a pipe comprising the steps of:

a) providing a sealing assembly including a first plate member supported by a rod member and having a first beveled surface terminating in a first circumferential surface, a second plate member slidably supported by the rod member and having a second beveled surface terminating in a second circumferential surface, a sealing member supported by and engaged to the rod member between the first plate member and the second plate member and having a first flange with a generally arcuate surface terminating in a first edge and a second flange with a generally arcuate surface terminating in a second edge;

b) disposing the first edge of the first flange on the beveled surface of the first plate member;

c) disposing the second edge of the second flange on the second beveled surface of the second plate member;

d) positioning the sealing assembly in a pipe having an internal surface;

e) moving the first edge of the first flange along the first beveled surface of the first plate member, and moving the second edge of the second flange along the second beveled surface of the second plate member, causing the first flange and the second flange to move outwardly and towards each other until the first generally arcuate surface and the second generally arcuate surface are respectively generally flushed against the first circumferential surface and the second circumferential surface and the first flange and the second flange have sealably engaged the internal surface of the pipe to plug the pipe.

It is therefore an object of the present invention to provide an apparatus for making a sealing engagement with an internal surface of a pipe.

It is another object of the present invention to provide a method for plugging a pipe.

These, together with various ancillary objects and features which will become apparent to those skilled in the art as the following description proceeds, are attained by this novel apparatus and method, a preferred embodiment thereof shown with reference to the accompanying drawings, by way of example only, wherein:

DETAILED DESCRIPTION OF THE INVENTION

Figure 1A:
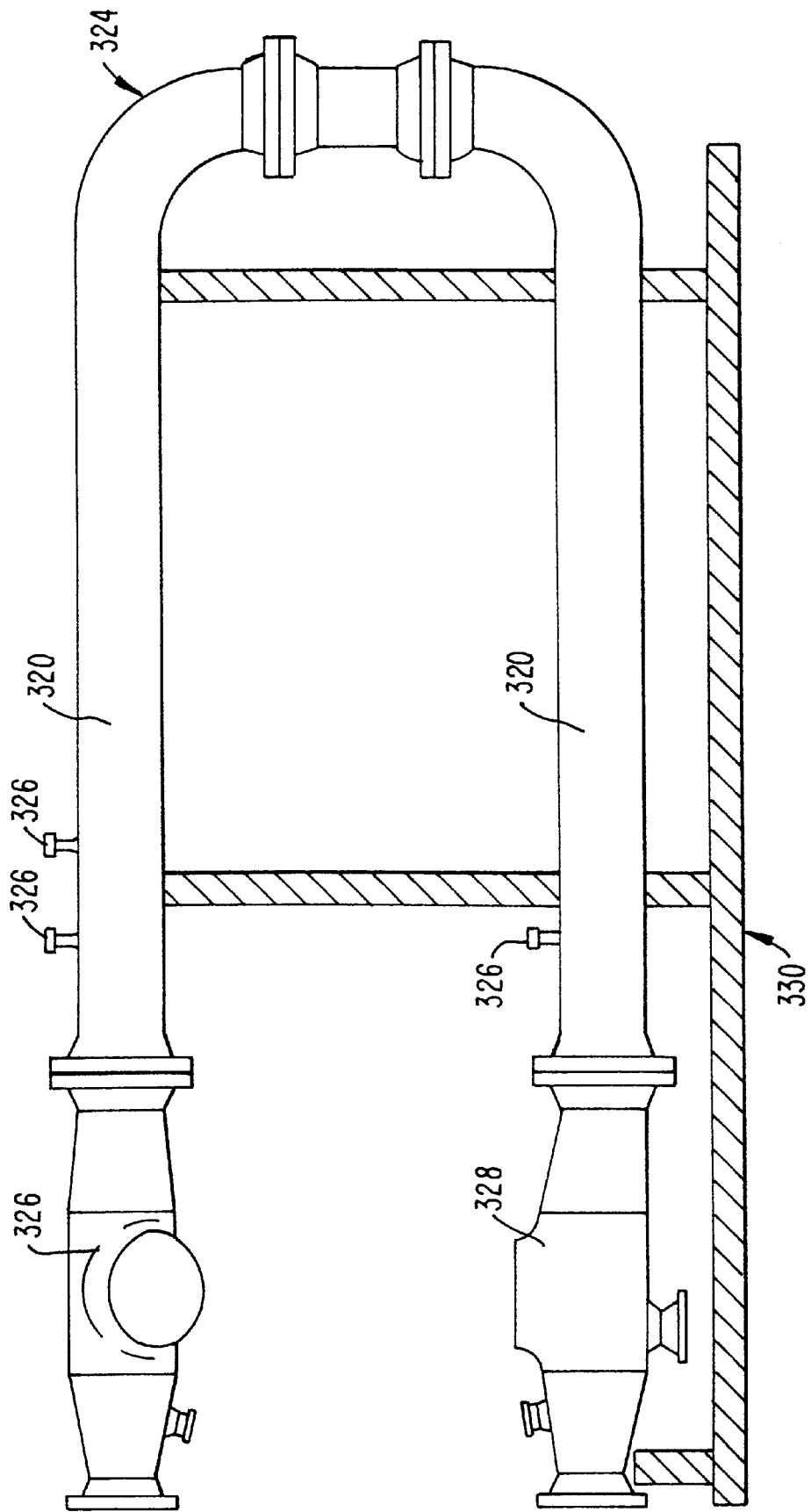
FIG. 1A is a side elevational view of part of the piping assembly for a prior art unidirect prover.
Figure 1B:
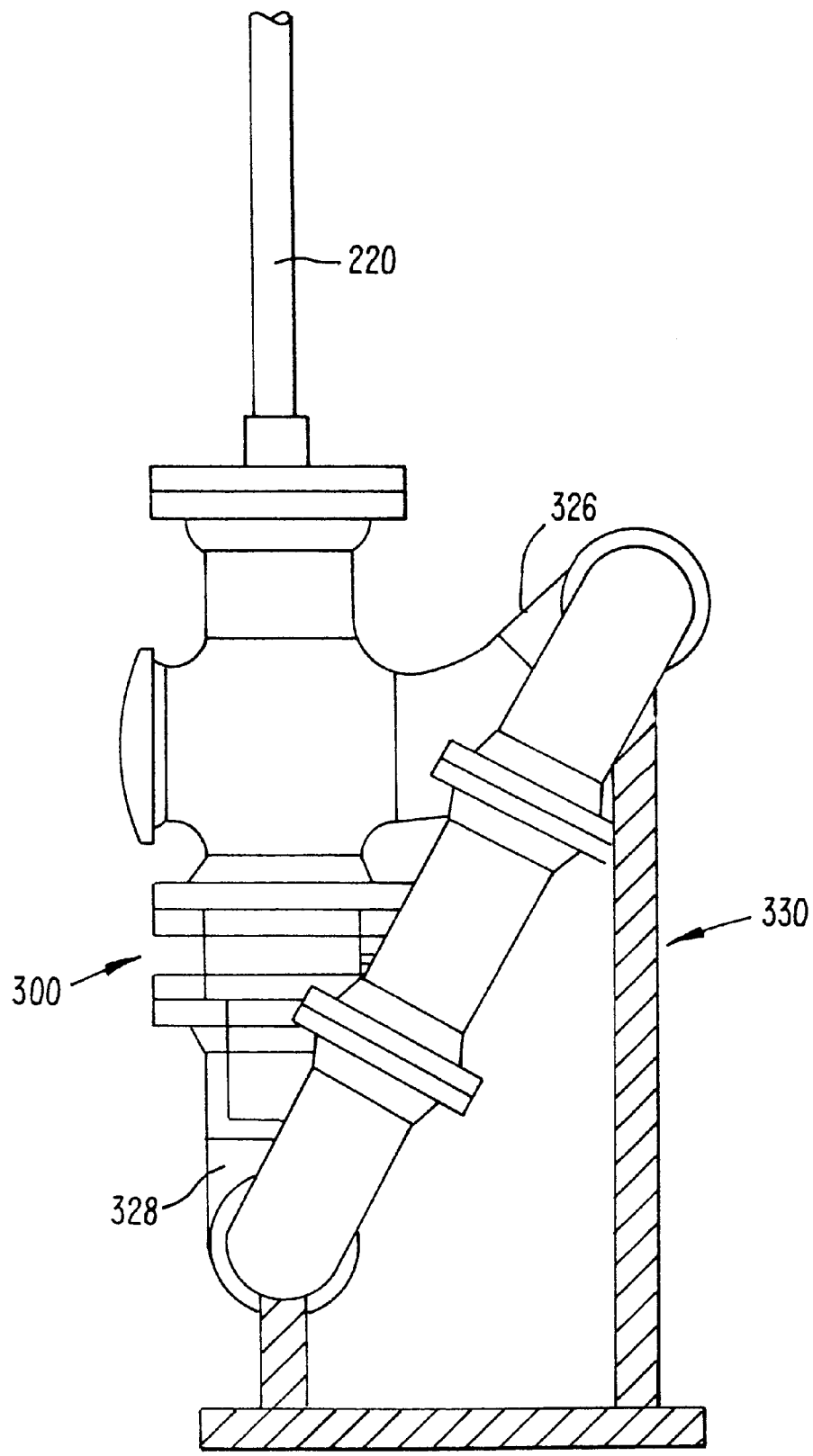
FIG. 1B is an end elevational view of the unidirect piping assembly of FIG. 1A having an interchange with the sealing apparatus of the present invention disposed therein to releasably seal the same.

Referring in detail now to the drawings wherein similar parts of the invention are identified by like reference numerals, there is seen an apparatus (i.e. an interchange sealing device), generally illustrated as 10. The apparatus 10 includes a pair of plate members 14 and 18, a seal or sealing member, generally illustrated as 22, and a coupling assembly, generally illustrated as 26.

Plate member 14 includes an aperture 28 and a recess 32 which is generally concentric with aperture 28. Aperture 28 terminates in recess 32 to communicate therewith. Plate member 14 has a circumferential surface 36 and an inwardly tapering, beveled surface 40 angularly extending from beveled surface 40.

Figure 9:
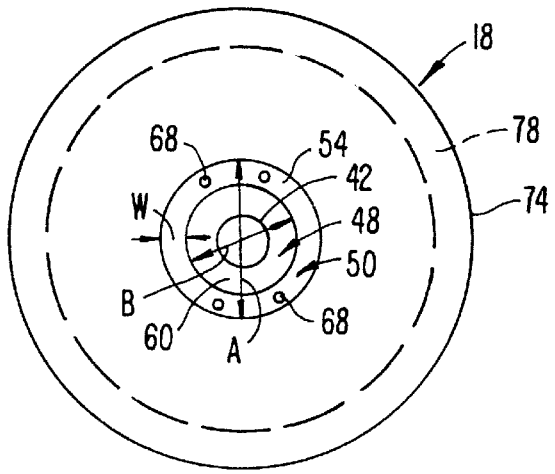
FIG. 9 is an end elevational view of the top plate member of the sealing apparatus of the present invention.
Figure 10:
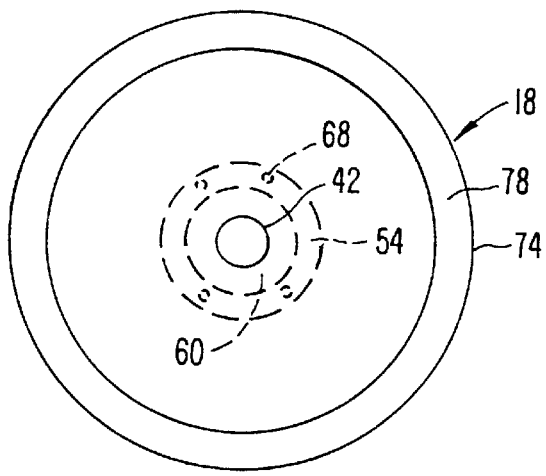
FIG. 10 is an end elevational view of the top plate member, opposite to the end depicted in the end elevational view in FIG. 9.
Figure 11:
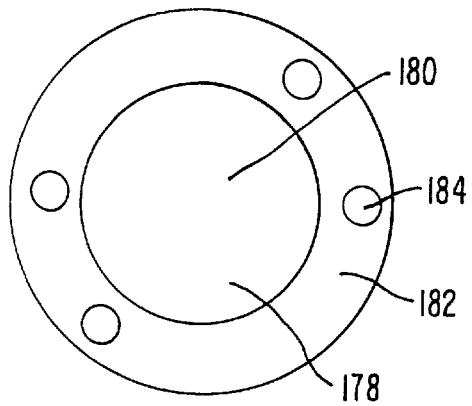
FIG. 11 is an end elevational view of one of the segments or parts of the coupling assembly for the sealing apparatus of the present invention.
Figure 12:
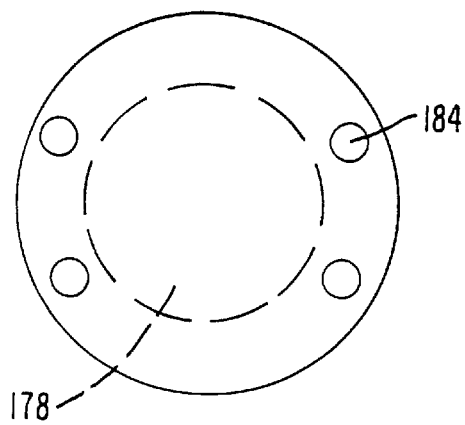
FIG. 12 is an end elevational view of the segment of FIG. 11, opposite to the end shown in the end elevational view in FIG. 11.
Figure 13:
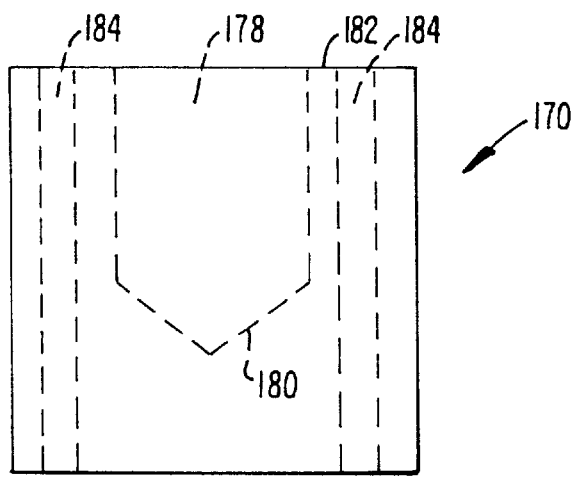
FIG. 13 is a side elevational view of the segment of FIG. 11.
Figure 14:
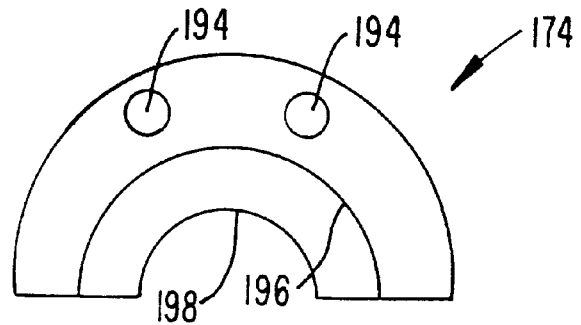
FIG. 14 is an end elevational view of another segment of the coupling assembly for the sealing apparatus of the present invention.
Figure 15:
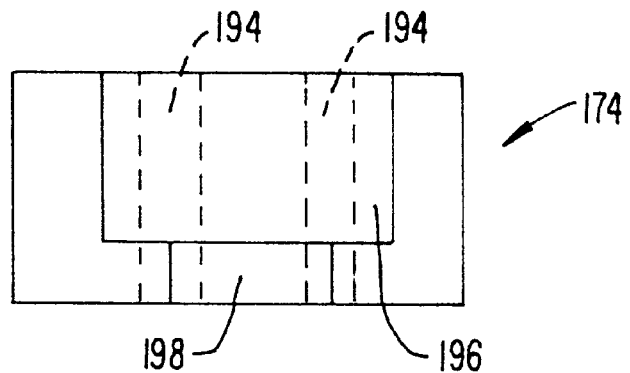
FIG. 15 is an end elevational view of the segment in FIG. 14.
Figure 16:
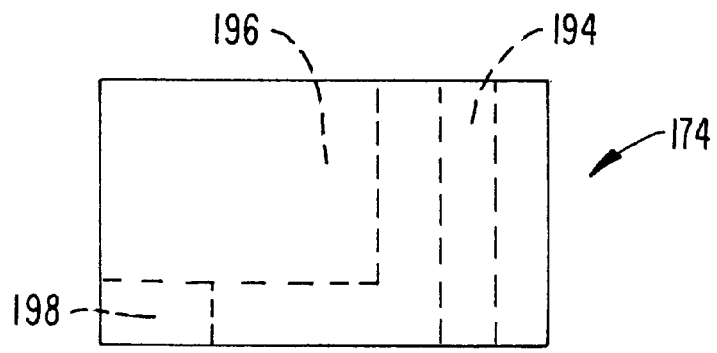
FIG. 16 is a side elevational view of the segment in FIG. 14.

Plate member 18 comprises an aperture 42 and a cavity or recess, generally illustrated as 46. Recess 46 consists of a lower cavity or recess 48 and an upper cavity or recess 50. Recess 50 has a width A and includes a surface 54 and a cylindrical wall 56 as defining boundaries (see FIGS. 3 and 9). Surface 54 is a ring-like surface having a breadth or width W. Recess 48 has a width B (see FIGS. 3 and 9) and a bottom 60 which is interrupted by aperture 42. The width B of recess 48 is less than width A and is defined by a diameter of a cylindrical wall 64. A plurality of threaded bolt-receiving recesses 68 circumferential surrounds recess 48 while piercing and interrupting surface 54. Plate member 18 also comprises a circumferential surface 74 and an inwardly tapering, beveled surface 78 that angularly extends from circumferential surface 74.

Figure 3:
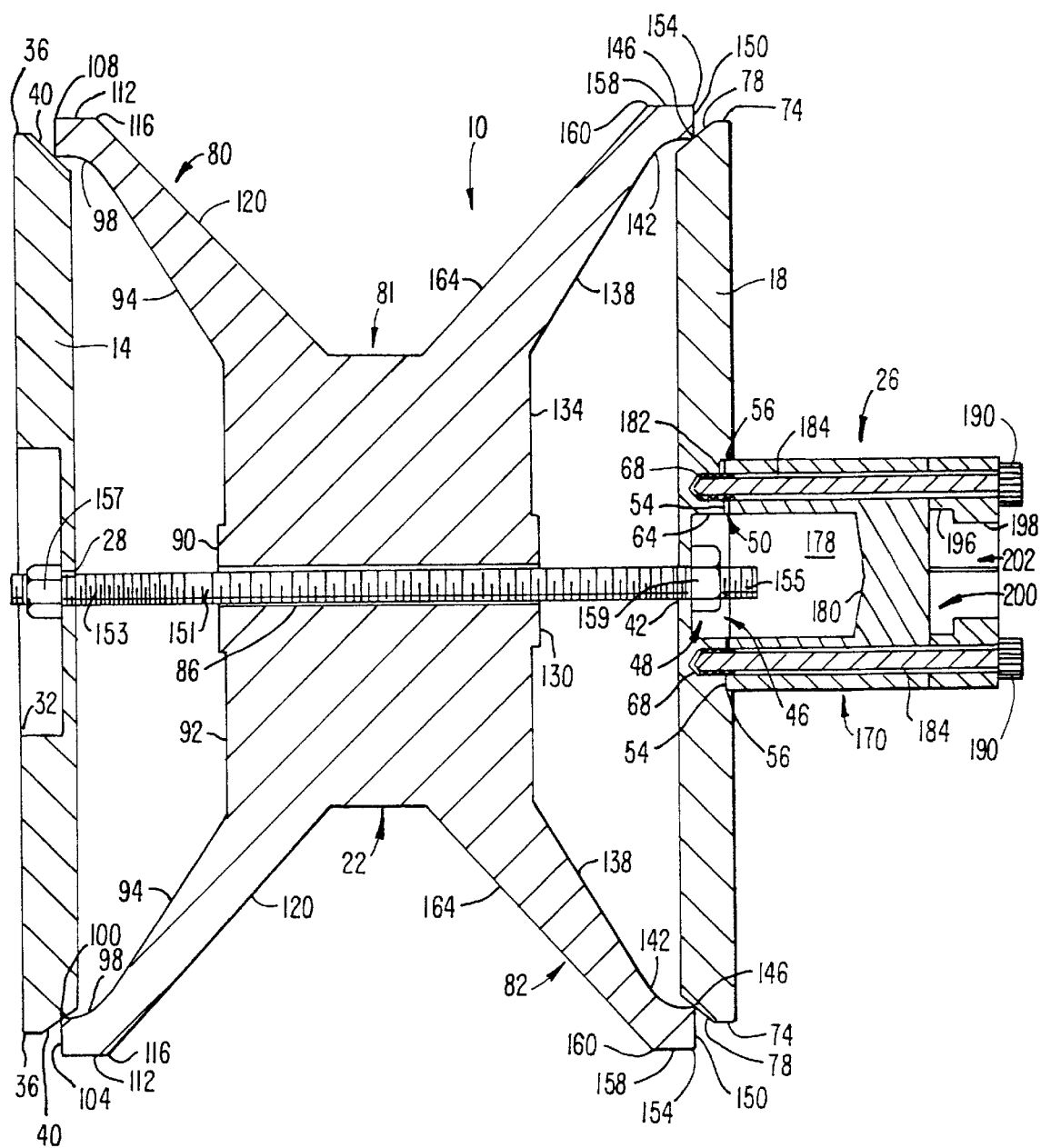
FIG. 3 is a vertical sectional view through the sealing apparatus of the present invention.
Figure 4:
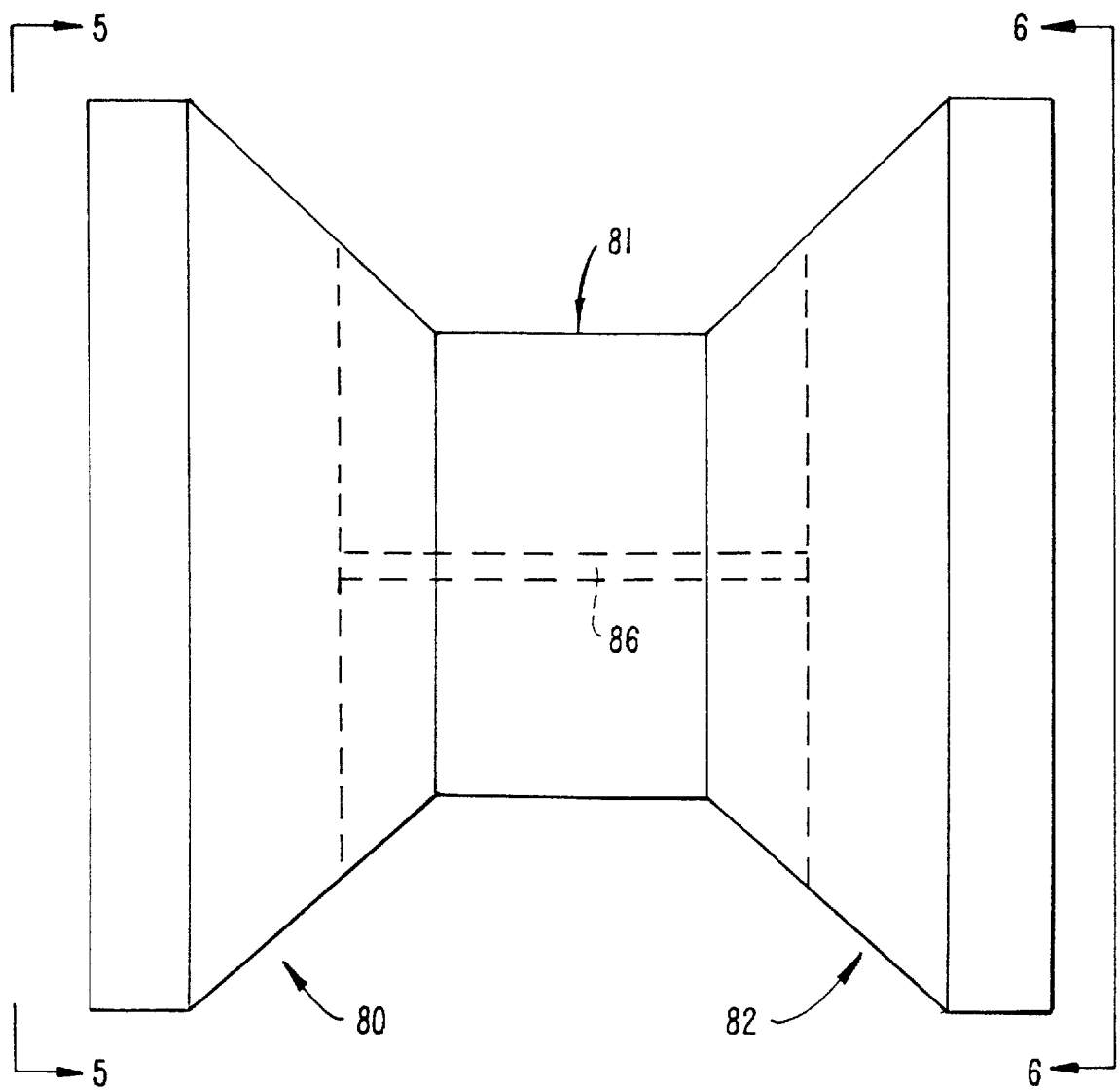
FIG. 4 is a top plan view of the sealing which is disposed between the top plate and the bottom plate of the sealing apparatus of the present invention.
Figure 5:
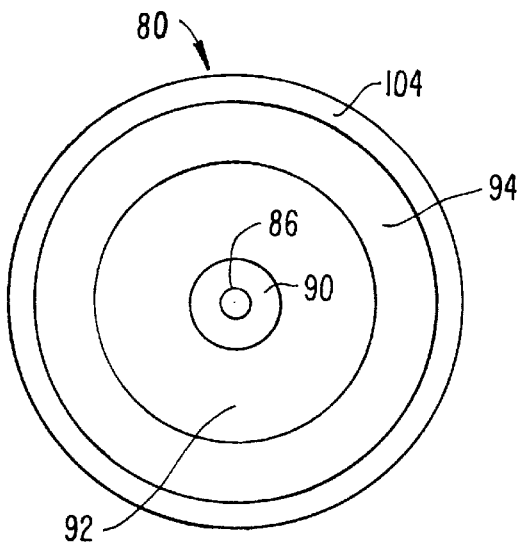
FIG. 5 is an end elevational view taken in direction of the arrows and along the plane of line 5—5 in FIG. 4.
Figure 6:
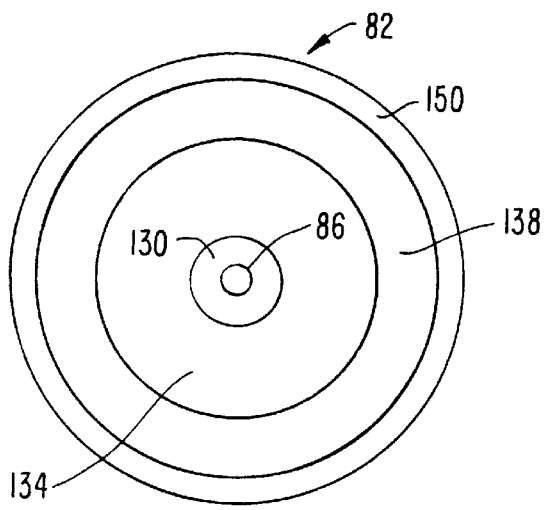
FIG. 6 is an end elevational view taken in direction of the arrows and along the plane of line 6—6 in FIG. 4.
Figure 7:
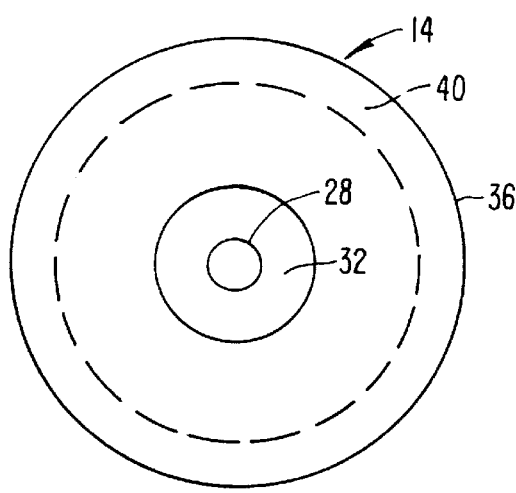
FIG. 7 is an end elevational view of the bottom plate member.
Figure 8:
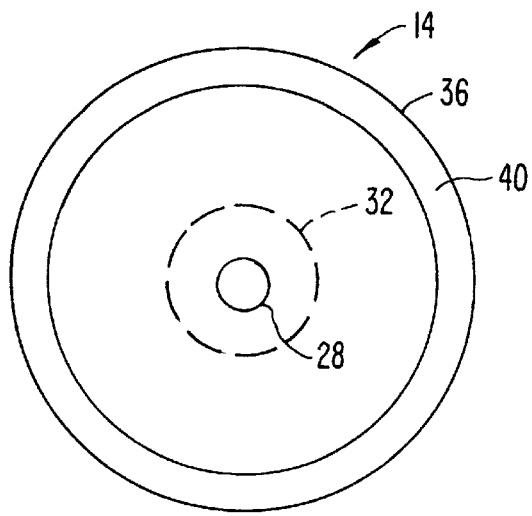
FIG. 8 is an end elevational view of the bottom plate member, opposite to the end depicted in the end elevational view in FIG. 7.

The seal or sealing member 22 includes an intermediate cylindrical body 81 and a pair of flanges 80 and 82 bound thereto. Each of the flanges 80 and 82 has a generally frustco-conical geometric shape (see FIGS. 3 and 4). The seal or sealing member 22 has a structure defining a threaded longitudinal bore 86. Flanges 80 and 82 may either be integrally bound as best shown in FIG. 3, or may be two pieces which when disposed next to each other in a juxtaposedly relationship, has the one-piece construction as shown in FIG. 3. The two piece embodiment for the sealing member 22 would apply to situations where the sealing member 22 is too large to be conveniently manufactured in an integral fashion. Extending radially outwardly from the threaded longitudinal bore 86 in order to define the flange 80 is a raised structure or platform 90 which extends away from a cylindrical wall 92. Cylindrical wall 92 merges into a slanted surface 94. The slanted surface 94 flares outwardly from the cylindrical wall 92 and merges into a generally arcuate circumferential surface 98 which terminates in a generally circular edge 100. Edge 100 is a boundary for a peripheral, circumferential surface 104 along with an edge 108 (see FIG. 3). Thus, circumferential surface 104 is between edges 100 and 108. Extending away from the edge 108 to further define the flange 80 is a generally cylindrical surface 112 which ceases at edge 116. Therefore, edges 108 and 116 are boundaries for the cylindrical surface 112. A beveled surface 120 commences from edge 116 and extends inwardly until reaching the intermediate cylindrical body 81 of the seal or sealing member 22.

Also extending radially outwardly from the threaded longitudinal bore 86 in order to define the flange 82 is a raised structure or platform 130 which is dimensioned after platform 90. Platform 130 is integrally formed with a cylindrical wall 134 and extends away therefrom. Cylindrical wall 134 merges into a slanted surface 138 which flares outwardly from the cylindrical wall 134. Slanted surface 138 merges into a generally arcuate circumferential surface 142 which terminates in a generally circular edge 146. Edge 146 is a boundary for a peripheral, circumferential surface 150 along with an edge 154 (see FIG. 3). Thus, edges 146 and 154 are boundaries for circumferential surface 150. Extending away from the edge 154 to further define the flange 82 is a generally cylindrical surface 158 which ceases at an edge 160. Edges 154 and 160 represent extremities for the cylindrical surface 158. Flange 82 also includes a beveled surface 164 that commences from edge 160 and extends inwardly until reaching the intermediate cylindrical body 81 of the sealing member 22.

The apparatus 10 also includes a rod 151 which conveniently has a pair of opposed threaded ends 153 and 155. As best shown in FIG. 3, rod 151 passes through aperture 28 of plate member 14, through threaded longitudinal bore 86, and through aperture 42 of plate member 18. As further best shown in FIG. 3, rod 151 threadably engages the sealing member 22 to hold the same stationary therewith. A pair of nuts 157 and 159 respectively engage threaded ends 153 and 155 to respectively prevent plate member 14 and plate member 18 from becoming disengaged from the rod 151 while the sealing member 22 remains affixed to the rod 151 between plate members 14 and 18. As best shown in FIG. 1D, plates members 14 and 18 are not bound to the rod 151 and are free to move along the rod 151 and towards each other to compress the sealing member 22 which is affixed to the rod 151.

The coupling assembly 26 includes a cylindrical member, generally illustrated as 170, and a pair of generally semi-cylindrical members, each generally illustrated as 174 (see FIG. 2 and FIGS. 11–16). Cylindrical member 170 includes a circular recess 178 (see FIGS. 11–13) having a funnel-shaped bottom 180. Recess 178 is circumferentially surrounded by a plurality of bores 184 which pierce an O-shaped surface 182 and align with threaded bolt-receiving recesses 68 of plate member 18 when O-shaped surface 182 is flushed against surface 54 of the plate member 18 (see FIG. 3). The width of O-shaped surface 182 is essentially equal to the width of surface 54 as best shown in FIG. 3. When the bores 184 are aligned with recesses 68, threaded bolts 190 (after passing through semi-cylindrical members 174) may pass through bores 184 and threadably engage threaded bolt-receiving recesses 68 to secure the coupling assembly 26 to the plate member 18.

Each of the semi-cylindrical members 174 (see FIGS. 14–16) has at least one, more specifically two longitudinal bores 194—194 and a pair of semicircular indentations 196 and 198 such that when the semi-cylindrical coupling members 174—174 are mounted against the cylindrical member 170, the bores 194 are aligned with the bores 184 and the semi-circular indentations 196 and 198 from both coupling members 174—174 form a lower cavity 200 and an upper cavity 202 which communicates with the lower cavity 200. The lower cavity 200 has a diameter that is greater than the diameter of the upper cavity 202. With the alignment of bores 194 and bores 184, bolts 194—194 may pass therethrough as previously indicated to secure the coupling members 174—174 to cylindrical member 170. As previously indicated, the bolts 194 pass through bores 194 and bores 184 and threadably secure within threaded bolt-receiving recesses 68 to secure the coupling assembly 26 to the plate member 18.

Figure 1C:
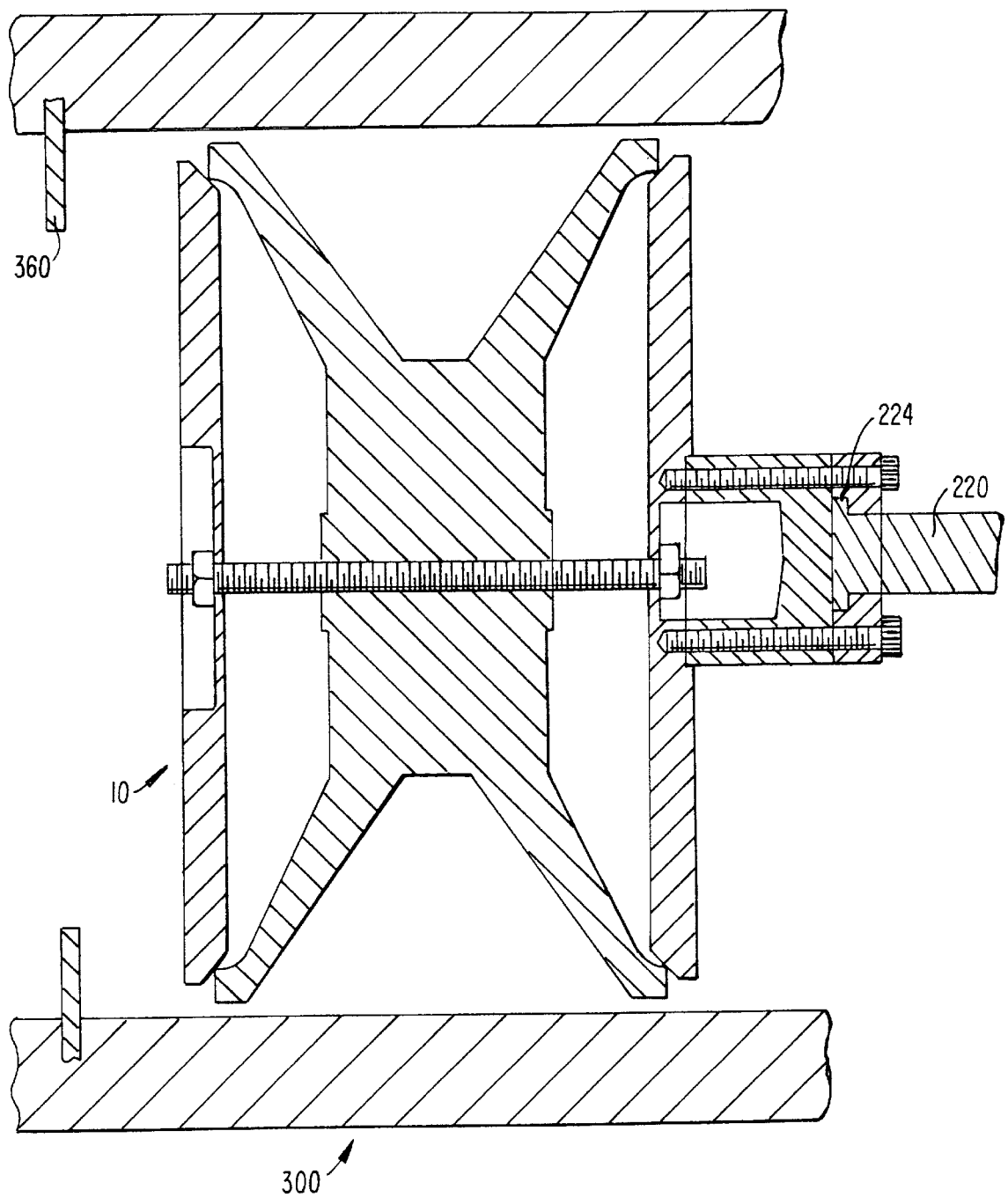
FIG. 1C is a partial vertical sectional view of the interchange sealing device of the present invention disposed in an interchange section and engaged to a hydraulic plunger which is pushing the sealing device towards a stop ring member such that a bottom plate of the sealing device may engage and flush against the stop ring member.
Figure 1D:
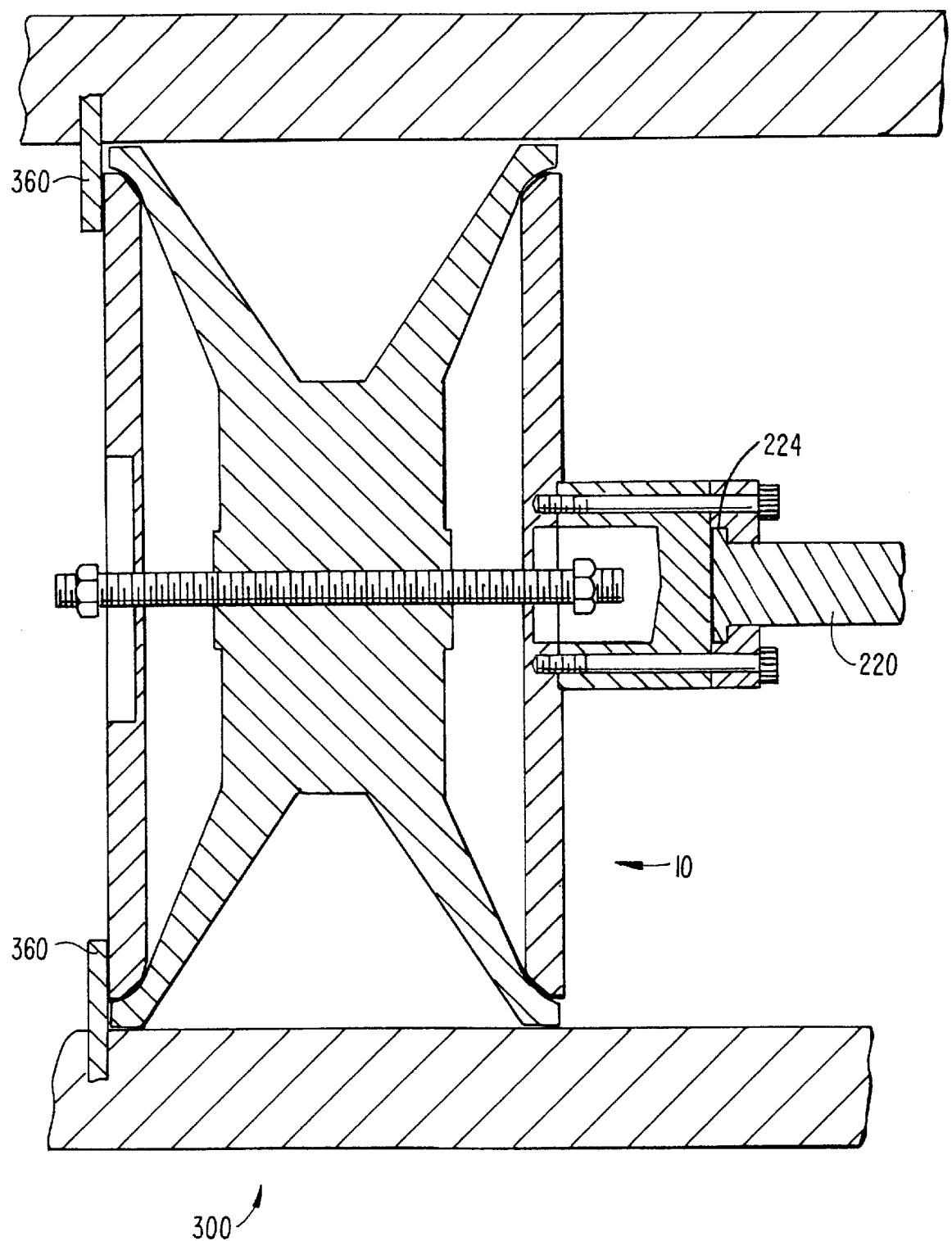
FIG. 1D is a partial vertical sectional view of the interchange section and of the interchange sealing device of the present invention after the a bottom plate of the interchange sealing device has engaged and been flushed against the stop ring member and after the hydraulic plunger has pushed the top plate towards the bottom plate and has caused the sealing member in between the plates to compress and expand to seal off and plug the interchange section.
Figure 2:
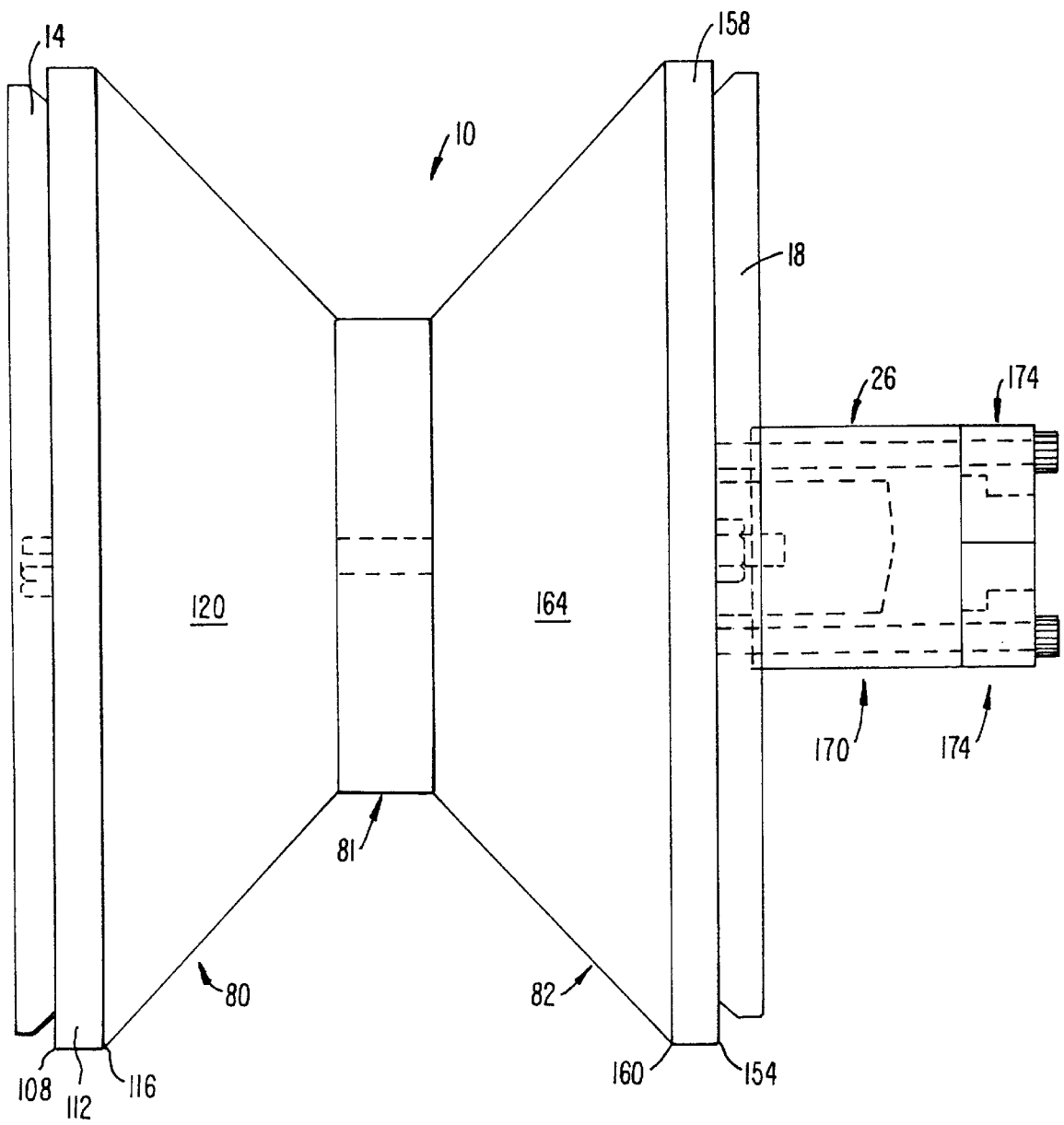
FIG. 2 is a side elevational view of the sealing apparatus of the present invention for sealing-off the internal surface of a pipe to provide a leakproof interengagement.

As best shown in FIGS. 1C and 1D, cavities 200 and 202 provide suitable openings for receiving a hydraulic plunger or shaft 220 having a flanged end 224 that is releasably housed within the lower cavity 200. When the hydraulic plunger 220 is coupled to the coupling assembly 26 as such, the hydraulic plunger 220 extends outside of the interchange assembly 300.

The plate members 14 and 18 and the coupling assembly 26 may be manufactured of any suitable material, such as steel. The sealing member 22 may also be manufactured of any suitable material, preferably a rubber or a plastic such as polyurethane, polyethylene, polypropylene, polyacetal, polyvinylilene chloride, polyester, diallylphthalate, polytetra fluora ethylene, polychloro-trifluoro ethylene, polymethyl alpha chloroacrylate, thermoplastic polyamide resin, polyphenylene sulfide and the like, plasticized polyvinyl chloride, rubber, neoprene, urethane or ethylene propylene diene monomer (EPDM).

The interchange assembly 300 connects to and interengages a pair of coupling conduits 326 and 38 which communcatively engage a pair of conduit arms 320—320 of a unidirect prover, generally illustrated as 324 in FIG. 1A. Unidirect prover 324 is generally U-shaped and includes indicators 326 to which a meter (not shown) is connected in order to be tested. Unidirect prover 324 is a meter prover which is for checking the accuracy of meters. The amount of fluid passing through the unidirect prover 324 is compared with the reading on the meter. A support assembly 330 supports the unidirect prover 324. The support assembly 330 may rest on a truck bed or may be placed at the location where a meter is to be checked for accuracy.

The hydraulic plunger 220 is coupled to a power means (not shown in the drawings) which is for pushing and pulling the hydraulic plunger 220. When the hydraulic plunger 220 is pushed in, the sealing apparatus 10 travels towards a stop ring 360 (see FIG. 1C) which is part of the interchange 300. The hydraulic plunger 220 continues pushing the apparatus 10 until the plate member 14 is flushed against the stop ring 360. Continual pushing of the hydraulic plunger 220 causes plate member 18 to move towards plate member 14. As the plate member 18 moves towards plate member 14, edges 100 and 154 commence respectively moving up beveled edges 40 and 78 of the plate members 14 and 18 respectively. Such movement causes the flanges 80 and 82 of the sealing member 22 to move outwardly and towards each other until the arcuate surfaces 98 and 142 are respectively flushed against the surfaces 36/40 and 74/78 (see FIG. 1D). In this position the surfaces 112 and 158 of flanges 80 and 82 are firmly lodged against the internal surface of the interchange 300 (as best shown in FIG. 1D) to plug the same. The process may be reversed by pulling hydraulic plunger 220 in the opposite direction, causing plate member 18 to become disengaged from flange 82, which subsequently frees flange 82 from engagement with the inside surface of the interchange 300. Continual movement of the plate member 18 by the hydraulic plunger 220 causes the plate member 18 to become engaged again with nut 149, and subsequently the sealing member 81 will move, causing flange 80 to become disengaged from plate member 14.

Therefore, while the present invention has been described herein with reference to the particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for making a sealing engagement with an internal surface of a pipe to plug the pipe to prevent fluid from passing through the pipe comprising a first plate member having a first aperture; a second plate member having a second aperture; a sealing member including an intermediate cylindrical body having a diameter with a body dimension and a pair of generally frustco-conical shape flanges bound to the intermediate body with each flange extending outwardly therefrom and terminating in a circumferential edge having a diameter with an edge dimension greater than the body dimension, said intermediate cylindrical body having a structure defining a bore; a rod member having a first end and a second end and passing through said first aperture, said bore, and said second aperture; a first means, attached to said first end of said rod member, for engaging said first plate member to prevent said first plate member from becoming disengaged from said rod member; a second means, attached to said second end of said rod member, for capably engaging said second plate member to prevent said second plate member from becoming disengaged from said rod member; and a coupling assembly including a first coupling member secured to said second plate member and at least one second coupling member connected to said first coupling member for making a releasable connection with a plunger member.

2. The apparatus of claim 1 wherein said first coupling member has a structure defining a first recess and a plurality of longitudinal first bores.

3. The apparatus of claim 2 wherein said second plate member has at least one second plate cavity communicating with said first recess of said first coupling member.

4. The apparatus of claim 3 wherein said at least one second plate cavity comprises a lower second plate cavity and an upper second plate cavity having a bottom cavity surface with a width and which terminates in said lower second plate cavity.

5. The apparatus of claim 4 wherein said first recess of said first coupling member is circumscribed by a cylindrical structure having a perimetrical surface with a width that is essentially equal to said width of the bottom cavity surface, and said bottom cavity surface is flushed against said perimetrical surface.

6. The apparatus of claim 5 wherein said second plate member has at least one second plate recess circumscribing said lower second plate cavity and piercing said bottom cavity surface.

7. The apparatus of claim 6 wherein said first plate member has a first plate recess which is generally co-axial with said first aperture.

8. The apparatus of claim 7 wherein said first plate member has a first beveled surface and said second plate member has a second beveled surface.

9. The apparatus of claim 1 wherein said at least one second coupling member comprises a pair of second coupling members with each second coupling member including at least one longitudinal second bore and a pair of generally semi-circular indentations such that when said pair of second coupling members are mounted against said first coupling member, said at least one longitudinal second bore is aligned with at least one of said longitudinal first bores and said generally semi-circular indentations from both of said coupling member form a lower cavity and an upper cavity which communicates with the lower cavity and wherein said lower cavity has a diameter that is greater than a diameter of the upper cavity.

10. The apparatus of claim 1 wherein said second plate member has at least one second plate cavity.

11. The apparatus of claim 1 wherein said first plate member has a first plate recess which is generally co-axial with said first aperture.

12. The apparatus of claim 1 wherein said first plate member has a first beveled surface and said second plate member has a second beveled surface.

13. The apparatus of claim 12 wherein each of said flanges has a slanting surface terminating in a generally arcuate surface.

14. The apparatus of claim 13 wherein said generally arcuate surface terminates in said circumferential edge that engages one of said first beveled surface said second beveled surface.

15. The apparatus of claim 1 wherein said sealing member is bound to said rod member.

16. An apparatus for engaging an internal surface of a pipe to plug the pipe to prevent fluids from passing through the pipe comprising a first plate member having a first aperture; a second plate member having a second aperture; a seal including an intermediate cylindrical body having an outside circumferential surface and a pair of generally frustoconical shaped flanges bound to the intermediate body and extending outwardly and away from the circumferential surface, each of said flanges terminating in a circumferential edge and said intermediate cylindrical body having a structure defining a bore; a rod member passing through said first aperture, through said bore, and through said second aperture; and a coupling assembly connected to said second plate member, said coupling assembly including a first recess that provides a space whereinto an end of said rod member may extend when said second plate member is moved towards said first plate member.

17. The apparatus of claim 16 wherein said rod member is bound to said seal and said coupling assembly additionally includes a second recess to provide an opening to engage a plunger member.

18. A method for plugging a pipe comprising the steps of:

a) providing a sealing assembly including a first plate member supported by a rod member and having a first beveled surface terminating in a first circumferential surface, a second plate member slidably supported by said rod member and having a second beveled surface terminating in a second circumferential surface, a sealing member supported by said rod member between said first plate member and said second plate member and having a first flange with a generally arcuate surface terminating in a first edge and a second flange with a generally arcuate surface terminating in a second edge;

b) disposing said first edge of said first flange on said first beveled surface of said first plate member;

c) disposing said second edge of said second flange on said second beveled surface of said second plate member;

d) positioning said sealing assembly in a pipe having an internal surface;

e) moving said first edge of said first flange along said first beveled surface of said first plate member, and moving said second edge of said second flange along said second beveled surface of said second plate member, causing said first flange and said second flange to move outwardly and towards each other until said first generally arcuate surface and said second generally arcuate surface are respectively generally flushed against said first circumferential surface and said second circumferential surface and said first flange and said second flange have sealably engaged the internal surface of said pipe to plug said pipe.

19. The method of claim 18 additionally comprising providing a generally U-shaped pipe assembly having a pair of pipe arms, and connecting said pipe of step (d) to said pair of pipe arms, and coupling a plunger member to said second plate member such that said plunger member extends out of said pipe of step (d).

20. The method of claim 18 wherein said pipe of step (c) includes a stop ring for engaging one of said flanges.

* * * * *